United States Patent
Robertson, Jr. et al.

(10) Patent No.: US 12,491,841 B2
(45) Date of Patent: Dec. 9, 2025

(54) VEHICLE ASSEMBLY FOR CLEANING SENSOR

(71) Applicant: Ford Global Technologies, LLC, Dearborn, MI (US)

(72) Inventors: Michael Robertson, Jr., Garden City, MI (US); Nicholas Sharpe, Grand Rapids, MI (US); Segundo Baldovino, Novi, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 271 days.

(21) Appl. No.: 18/360,123

(22) Filed: Jul. 27, 2023

(65) Prior Publication Data
US 2025/0033602 A1    Jan. 30, 2025

(51) Int. Cl.
*B60S 1/52* (2006.01)
*B60S 1/56* (2006.01)

(52) U.S. Cl.
CPC ............ *B60S 1/526* (2013.01); *B60S 1/56* (2013.01)

(58) Field of Classification Search
CPC .................................. B60S 1/526; B60S 1/56
USPC ...................................................... 239/284.1
See application file for complete search history.

(56) References Cited

U.S. PATENT DOCUMENTS

| | | | |
|---|---|---|---|
| 9,663,073 B2 * | 5/2017 | Tanaka | B60S 1/56 |
| 9,992,388 B2 * | 6/2018 | Romack | H04N 7/185 |
| 10,328,906 B2 * | 6/2019 | Hester | B60R 11/04 |
| 10,919,500 B2 | 2/2021 | Trebouet et al. | |
| 11,097,668 B2 | 8/2021 | Trebouet | |
| 2011/0073142 A1 * | 3/2011 | Hattori | B60S 1/481 134/198 |
| 2011/0292212 A1 * | 12/2011 | Tanabe | B05B 1/08 348/148 |
| 2015/0138357 A1 * | 5/2015 | Romack | B60S 1/52 348/148 |
| 2022/0410844 A1 * | 12/2022 | Haefner | B60S 1/522 |

FOREIGN PATENT DOCUMENTS

| | | |
|---|---|---|
| CN | 217532756 U | 10/2022 |
| JP | 2020152325 A | 9/2020 |

OTHER PUBLICATIONS

"Camera and Sensor Cleaning Systems", Continental Automotive, https://www.continental-automotive.com/en-gl/Passenger-Cars/Safety-and-Motion/Products/Washer-Systems/Camera-Cleaning-Systems.

* cited by examiner

*Primary Examiner* — Chee-Chong Lee
(74) *Attorney, Agent, or Firm* — Frank A. MacKenzie; Brooks Kushman P.C.

(57) ABSTRACT

A vehicle assembly includes a vehicle exterior panel, a nozzle, and a wind panel fixed to the nozzle. The nozzle and the wind panel are movable together along an axis between a retracted axial position concealed behind the vehicle exterior panel and an extended axial position extending outward from the vehicle exterior panel. The nozzle and the wind panel are rotatable together about the axis when in the extended axial position. The wind panel is arranged to rotate the nozzle about the axis responsive to airflow directed at the wind panel.

20 Claims, 14 Drawing Sheets

VEHICLE ASSEMBLY FOR CLEANING SENSOR

BACKGROUND

Vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (lidar) devices, and image processing sensors such as cameras. A lidar device detects distances to objects by emitting laser pulses and measuring the time of flight for the pulse to travel to the object and back.

DETAILED DESCRIPTION

Figure 1:
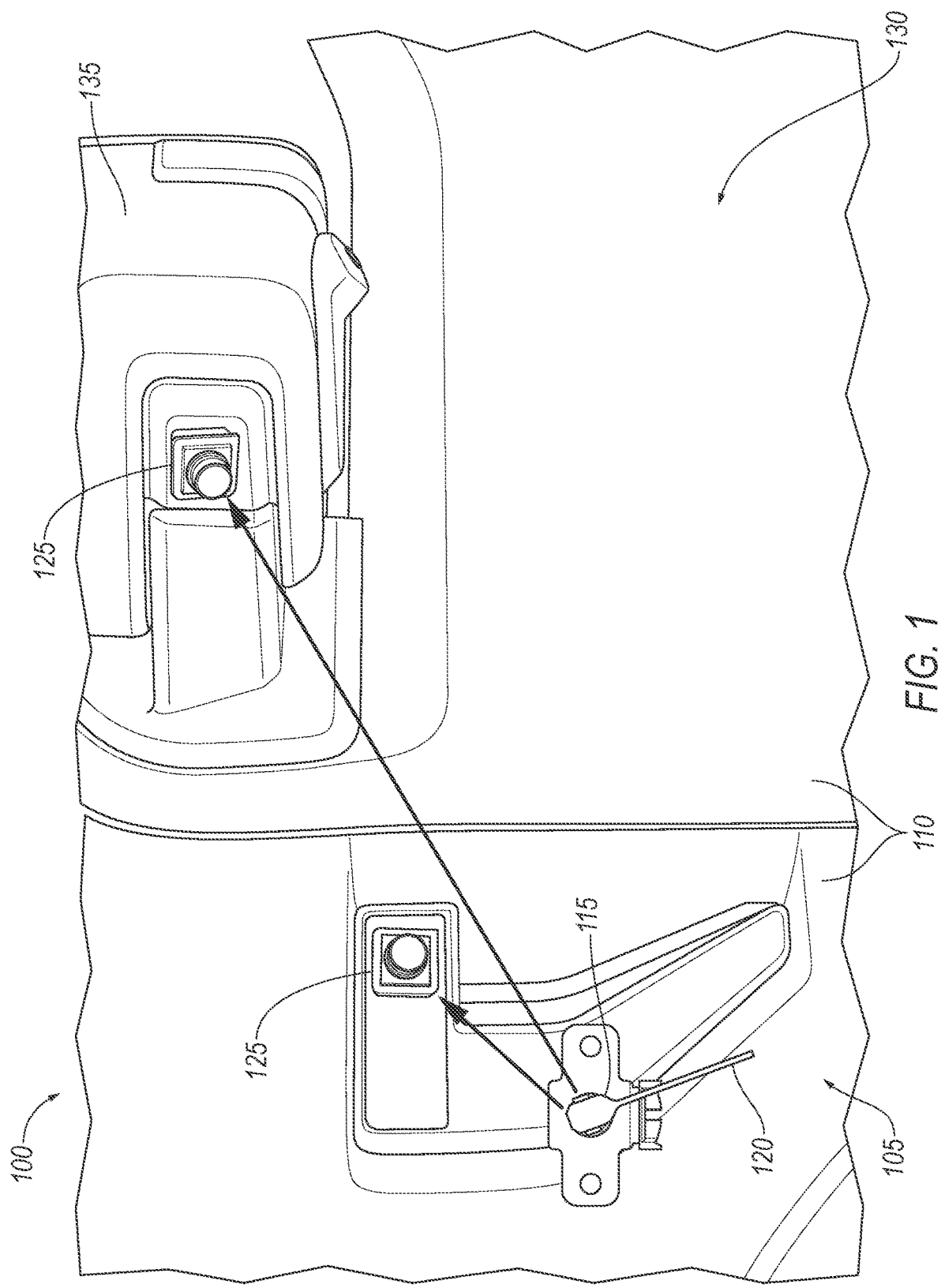
FIG. 1 is a side view of a portion of an example vehicle with a vehicle assembly.

A vehicle assembly includes a vehicle exterior panel, a nozzle, and a wind panel fixed to the nozzle. The nozzle and the wind panel are movable together along an axis between a retracted axial position concealed behind the vehicle exterior panel and an extended axial position extending outward from the vehicle exterior panel. The nozzle and the wind panel are rotatable together about the axis when in the extended axial position. The wind panel is arranged to rotate the nozzle about the axis responsive to airflow directed at the wind panel.

In an example, the vehicle assembly may further include a sensor coupled to the vehicle exterior panel, and the nozzle in the extended axial position may be rotatable about the axis to a first rotational position at which the nozzle is aimed at the sensor. In a further example, the nozzle in the extended axial position may be rotatable about the axis to a second position at which the nozzle is aimed in a direction for which the sensor is in a path of liquid ejected by the nozzle and redirected by airflow across the vehicle exterior panel.

In an example, the wind panel may extend coplanar with the axis.

In an example, the wind panel may extend generally vertically.

In an example, the vehicle assembly may further include a cylindrical chamber fixed relative to the vehicle exterior panel and centered on the axis and a plunger slidable within the cylindrical chamber along the axis, the nozzle may be located at an end of the plunger, and the nozzle and the wind panel may be movable along the axis between the retracted axial position and the extended axial position together with the plunger sliding within the cylindrical chamber. In a further example, the vehicle assembly may further include a ring fixed to the wind panel, the ring may extend around the cylindrical chamber and centered on the axis, and the ring may be slidable along an exterior surface of the cylindrical chamber and rotatable with the wind panel about the axis.

In another further example, the vehicle assembly may further include a spring attached to the cylindrical chamber and to the plunger, and the spring may be biasing the plunger to move the nozzle and wind panel to the retracted axial position when the nozzle and wind panel are in the extended axial position.

In another further example, the plunger may include a seal dividing an interior of the cylindrical chamber into a first region and a second region, the cylindrical chamber may include an inlet leading to the first region, and the plunger may include a passage fluidly connecting the first region and the nozzle. In a yet further example, pressurization of the first region may tend to push the plunger to move the nozzle and wind panel to the extended axial position.

In another further example, the vehicle assembly may further include a peg fixed relative to the vehicle exterior panel, the plunger may include a slot elongated parallel to the axis from a first end closer to the nozzle to a second end farther from the nozzle, the slot may taper narrower from the second end to the first end, and the peg may be positioned in the slot. In a yet further example, the vehicle assembly may further include a leaf spring positioned in the slot and engageable by the peg, and the leaf spring may be positioned to bias the plunger to a centered rotational position relative to the peg.

In an example, the vehicle assembly may further include a guide member fixed relative to the vehicle exterior panel, and the guide member may be arranged to force the wind panel to rotate to a center rotational position as the wind panel moves from the extended axial position to the retracted axial position. In a further example, the guide member may extend from a first end closer to the vehicle exterior panel to a second end farther from the vehicle exterior panel, and the guide member may include two guide surfaces that taper toward each other from the first end to the second end. In a yet further example, the wind panel may include a tab positioned to engage with the guide surfaces as the wind panel moves from the extended axial position to the retracted axial position. In a still yet further example, the tab may be spaced from the guide member along the axis when the wind panel is in the extended axial position.

In another still yet further example, the vehicle assembly may further include a stop fixed relative to the vehicle exterior panel, the stop may be positioned to block the wind panel from rotating beyond a first rotational position, and the tab may be positioned circumferentially between the guide surfaces at the first end of the guide member when the wind panel is in the first rotational position. In a continued still yet further example, the stop may be a first stop, the vehicle assembly further include a second stop, the second stop may be positioned to block the wind panel from rotating beyond a second rotational position, and the tab may be positioned circumferentially between the guide surfaces at the first end of the guide member when the wind panel is between the first and second rotational positions.

In an example, the wind panel may extend generally horizontally through the axis. In a further example, the wind panel may be an airfoil.

With reference to the Figures, wherein like numerals indicate like parts throughout the several views, a vehicle assembly 105 of a vehicle 100 includes a vehicle exterior panel 110, a nozzle 115, and a wind panel 120 fixed to the nozzle 115. The nozzle 115 and the wind panel 120 are movable together along an axis A between a retracted axial position concealed behind the vehicle exterior panel 110 and an extended axial position extending outward from the vehicle exterior panel 110. The nozzle 115 and the wind panel 120 are rotatable together about the axis A when in the extended axial position. The wind panel 120 is arranged to rotate the nozzle 115 about the axis A responsive to airflow directed at the wind panel 120.

The nozzle 115 delivers fluid to a sensor 125 for cleaning the sensor 125, which can be spaced a distance from the nozzle 115. For example, as shown in the Figures, the nozzle 115 and the sensor 125 can be located on a side of the vehicle 100, with the sensor 125 rearward from the nozzle 115 and also at a different height than the nozzle 115. The wind panel 120 can help the nozzle 115 accurately deliver the fluid to the sensor 125 both when the vehicle 100 is stationary and when the vehicle 100 is moving. The nozzle 115 can have a default rotational position (when in the extended axial position) in which the nozzle 115 is aimed straight at the sensor 125 or slightly upward from straight at the sensor 125 to account for the effects of gravity on the fluid. When the vehicle 100 is moving forward, the rearward airflow relative to the vehicle 100 flows across the wind panel 120, rotating the wind panel 120 and the nozzle 115 upward together. At this new rotational position, the nozzle 115 delivers fluid that, when following a path curved rearward by the airflow, still strikes the sensor 125.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a frame and a body 130. The vehicle 100 may be of a unibody construction, in which the frame and the body 130 of the vehicle 100 are a single component. The vehicle 100 may, alternatively, be of a body-on-frame construction, in which the frame supports the body 130 that is a separate component from the frame. The frame and body 130 may be formed of any suitable material, for example, steel, aluminum, etc.

The body 130 includes the vehicle exterior panels 110 partially defining an exterior of the vehicle 100. The vehicle exterior panels 110 may present a class-A surface, e.g., a finished surface exposed to view by a customer and free of unaesthetic blemishes and defects. The vehicle exterior panel 110 that is part of the vehicle assembly 105 may be located on a side of the vehicle 100. For example, the vehicle exterior panel 110 may be a fender, which provides the nozzle 115 a direct path to deliver fluid to the sensor 125 when the sensor 125 is located on a side-view mirror assembly 135. While the discussion below is with respect to a single vehicle assembly 105 of the vehicle 100, the vehicle 100 may include multiple vehicle assemblies 105, e.g., one on each side of the vehicle 100, e.g., one for each fender.

The vehicle assembly 105 may include the sensor 125. The sensor 125 may detect the external world, e.g., objects and/or characteristics of surroundings of the vehicle 100, such as other vehicles, road lane markings, traffic lights and/or signs, pedestrians, etc. For example, the sensor 125 may be a radar sensor, an ultrasonic sensor, a scanning laser range finder, a light detection and ranging (lidar) device, an image processing sensor such as a camera, etc. In particular, the sensor 125 may be a camera. The camera may detect visible light, infrared radiation, ultraviolet light, or some range of wavelengths including visible, infrared, and/or ultraviolet light. For example, the camera can be a charge-coupled device (CCD), complementary metal oxide semiconductor (CMOS), or any other suitable type.

The sensor 125 is coupled directly or indirectly to the vehicle exterior panel 110. For example, the sensor 125 may be mounted to the vehicle exterior panel 110, e.g., to the fender. For another example, the sensor 125 may be mounted to the side-view mirror assembly 135, which is indirectly coupled to the vehicle exterior panel 110 via a door and the frame of the vehicle 100. These locations can provide the sensor 125 with a field of view to the side of the vehicle 100, which can encompass lane markings, road users in adjacent lanes, etc. The sensor 125 can thereby provide data useful for advanced driver assistance systems (ADAS) such as lane-departure detection, blind-spot detection, lane-keeping assistance systems, and parking assistance systems.

Figure 2:
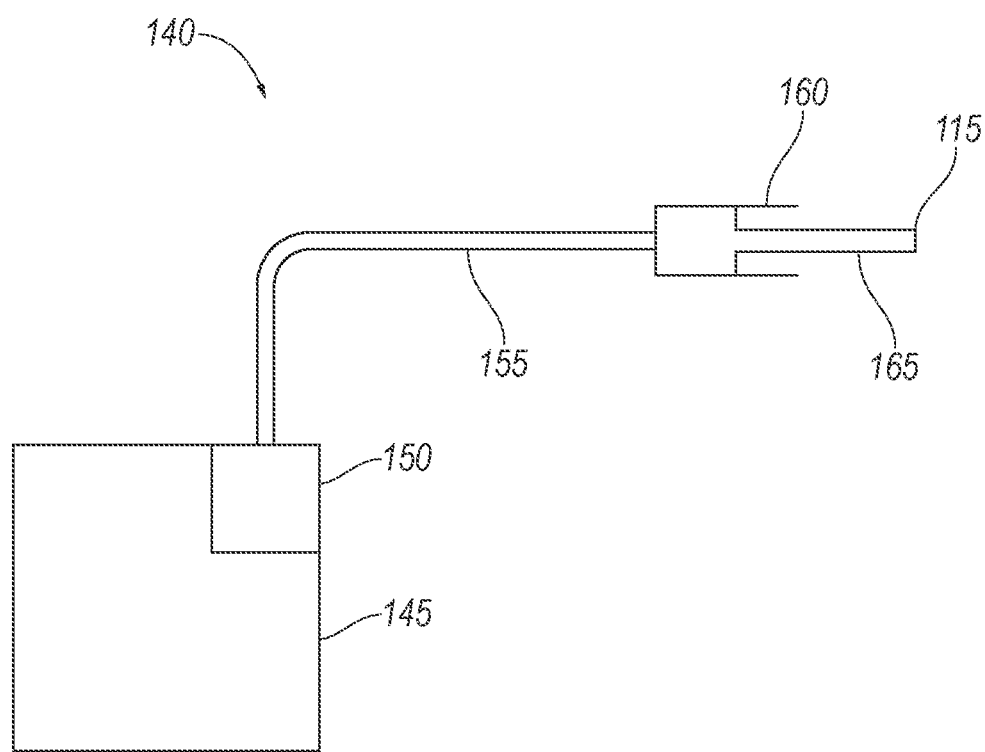
FIG. 2 is a diagram of an example fluid supply system of the vehicle assembly.

With reference to FIG. 2, the vehicle assembly 105 may include a fluid supply system 140. The fluid supply system 140 includes a reservoir 145, a pump 150, fluid supply lines 155, a cylindrical chamber 160, a plunger 165, and the nozzle 115. The reservoir 145, the pump 150, the cylindrical chamber 160, the plunger 165, and the nozzle 115 are fluidly connected to each other (i.e., fluid can flow from one to the other). The fluid supply system 140 distributes washer fluid stored in the reservoir 145 to the nozzle 115. "Washer fluid" is any liquid stored in the reservoir 145 for cleaning. The washer fluid may include solvents, detergents, diluents such as water, etc.

The reservoir 145 may be a tank fillable with liquid, e.g., washer fluid for window cleaning. The reservoir 145 may be disposed in a front of the vehicle 100, specifically, in an engine compartment forward of a passenger compartment. The reservoir 145 may store the washer fluid only for supplying the nozzle 115 or also for other purposes, such as supply to the windshield.

The pump 150 may force the washer fluid through the fluid supply lines 155 to the nozzle 115 with sufficient pressure that the washer fluid sprays from the nozzle 115. The pump 150 is fluidly connected to the reservoir 145. The pump 150 may be attached to or disposed in the reservoir 145.

The fluid supply lines 155 extend from the pump 150 to the cylindrical chamber 160. The fluid supply lines 155 may be, e.g., flexible tubes.

The cylindrical chamber 160 receives the washer fluid from the fluid supply line 155. When pressurized, the washer fluid in the cylindrical chamber 160 flows through the plunger 165 to the nozzle 115 and is ejected from the nozzle 115. When pressurized, the washer fluid in the cylindrical chamber 160 also tends to push the plunger 165 from the retracted axial position to the extended axial position, as will be explained in more detail below.

Figure 3:
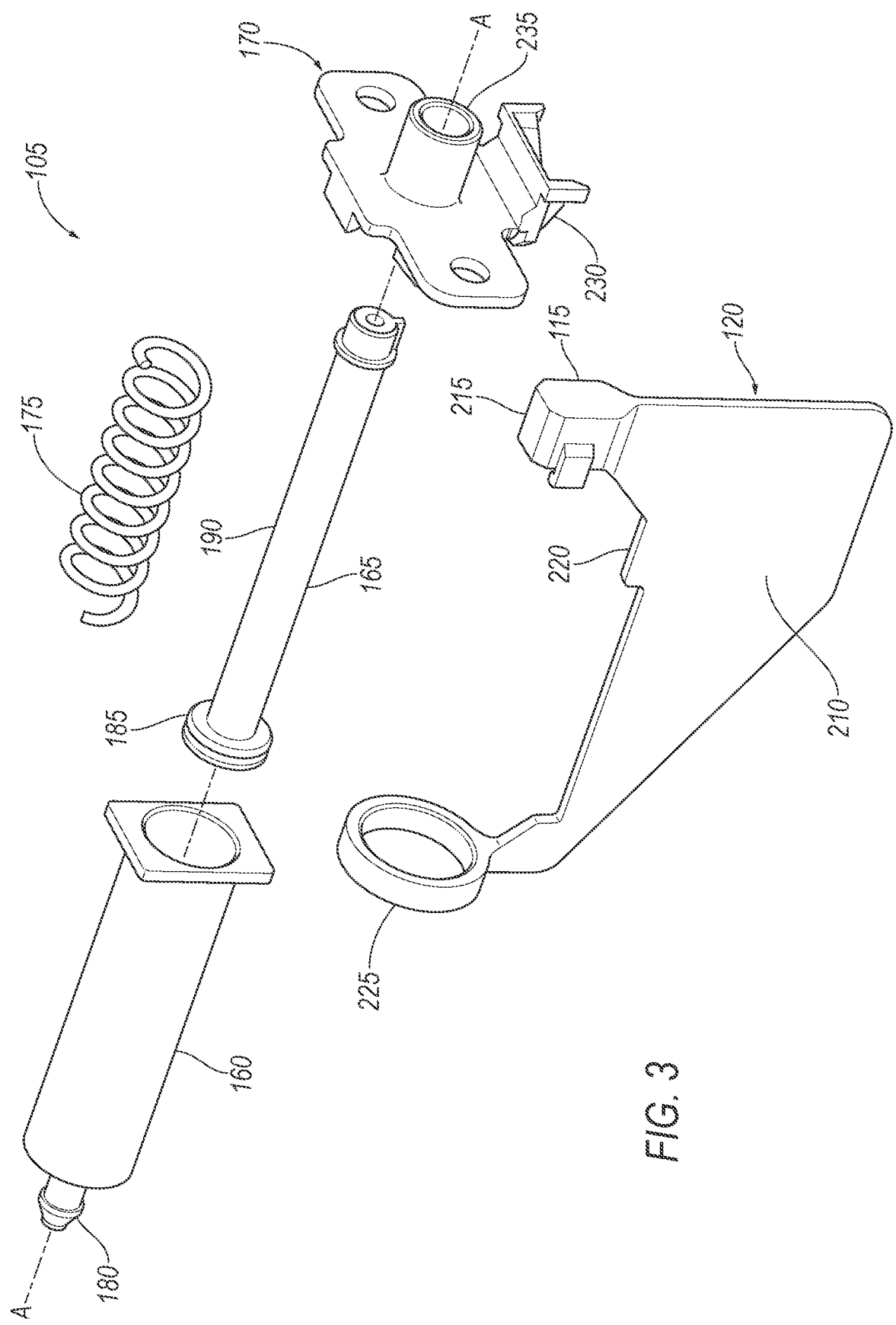
FIG. 3 is an exploded perspective view of a first example of the vehicle assembly.

With reference to FIG. 3, as an overview of a first example, the vehicle assembly 105 may include the vehicle exterior panel 110 (shown in FIG. 1), a bracket 170, the cylindrical chamber 160, the plunger 165, a spring 175, the nozzle 115, and the wind panel 120. The bracket 170 and the cylindrical chamber 160 may be fixed relative to the vehicle exterior panel 110. The spring 175 may extend from the cylindrical chamber 160 to the plunger 165. The plunger 165, the nozzle 115, and the wind panel 120 may be movable together relative to the vehicle exterior panel 110, the cylindrical chamber 160, and the bracket 170 along an axis A defined by the cylindrical chamber 160. The nozzle 115 and the wind panel 120 may be rotatable together about the axis A relative to the plunger 165, and the plunger 165 may be rotationally fixed relative to the cylindrical chamber 160 and the bracket 170.

The bracket 170 is fixed relative to the vehicle exterior panel 110. For example, the bracket 170 may be affixed or fastened to an interior or inboard side of the vehicle exterior panel 110 or to a frame member behind the vehicle exterior panel 110, such that the bracket 170 is concealed from an exterior of the vehicle 100.

Figure 4:
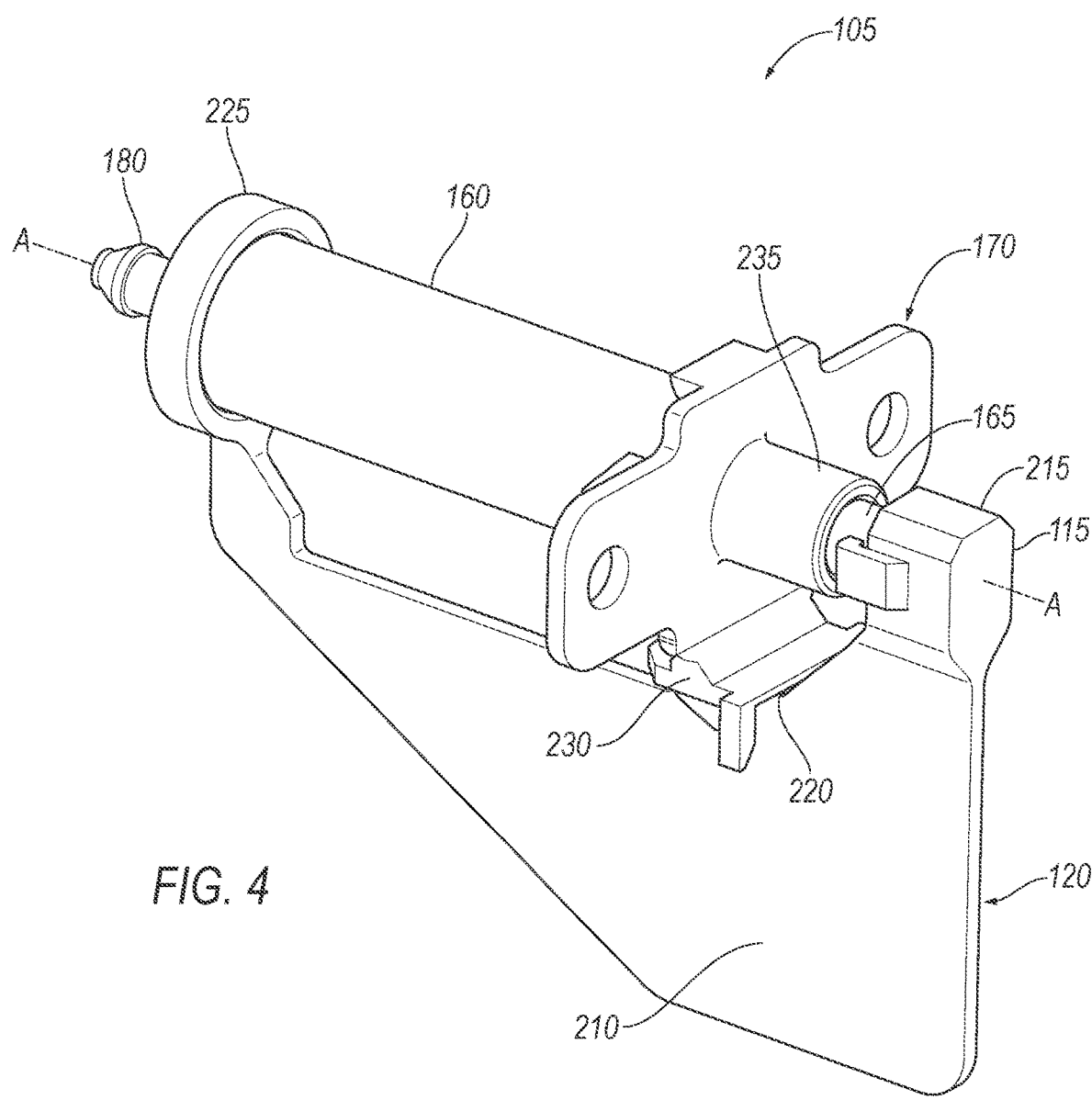
FIG. 4 is a perspective view of a portion of the first example of the vehicle assembly.

With reference to FIG. 4, the cylindrical chamber 160 is fixed relative to the vehicle exterior panel 110. For example, the cylindrical chamber 160 may be fixed to the bracket 170, e.g., affixed or clipped. The cylinder shape of the cylindrical chamber 160 defines the axis A such that the cylindrical chamber 160 is centered on the axis A.

The cylindrical chamber 160 has a hollow circular cross-section elongated from an inboard end farther from the vehicle exterior panel 110 to an outboard end closer to the vehicle exterior panel 110. The cylindrical chamber 160 include an inlet 180 at the inboard end leading to an interior of the cylindrical chamber 160. The outboard end of the cylindrical chamber 160 is open to permit entry of the plunger 165 (as shown in FIGS. 5A-B).

Figure 5A:
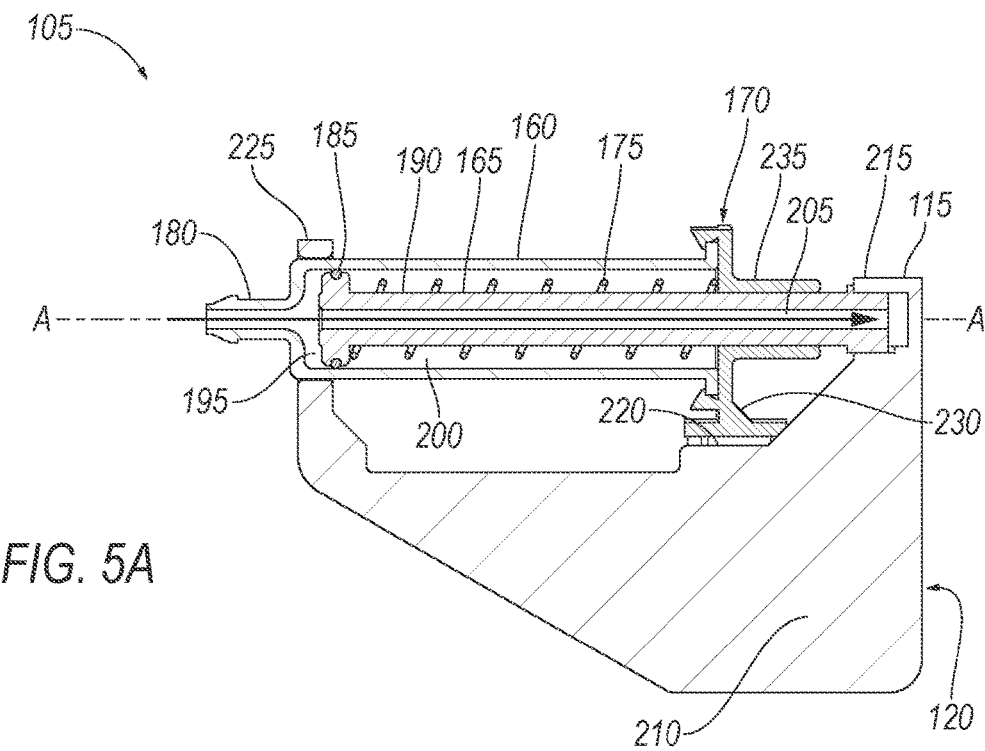
FIG. 5A is a side cross-sectional view of the portion of the first example of the vehicle assembly with a plunger in a retracted axial position.
Figure 5B:
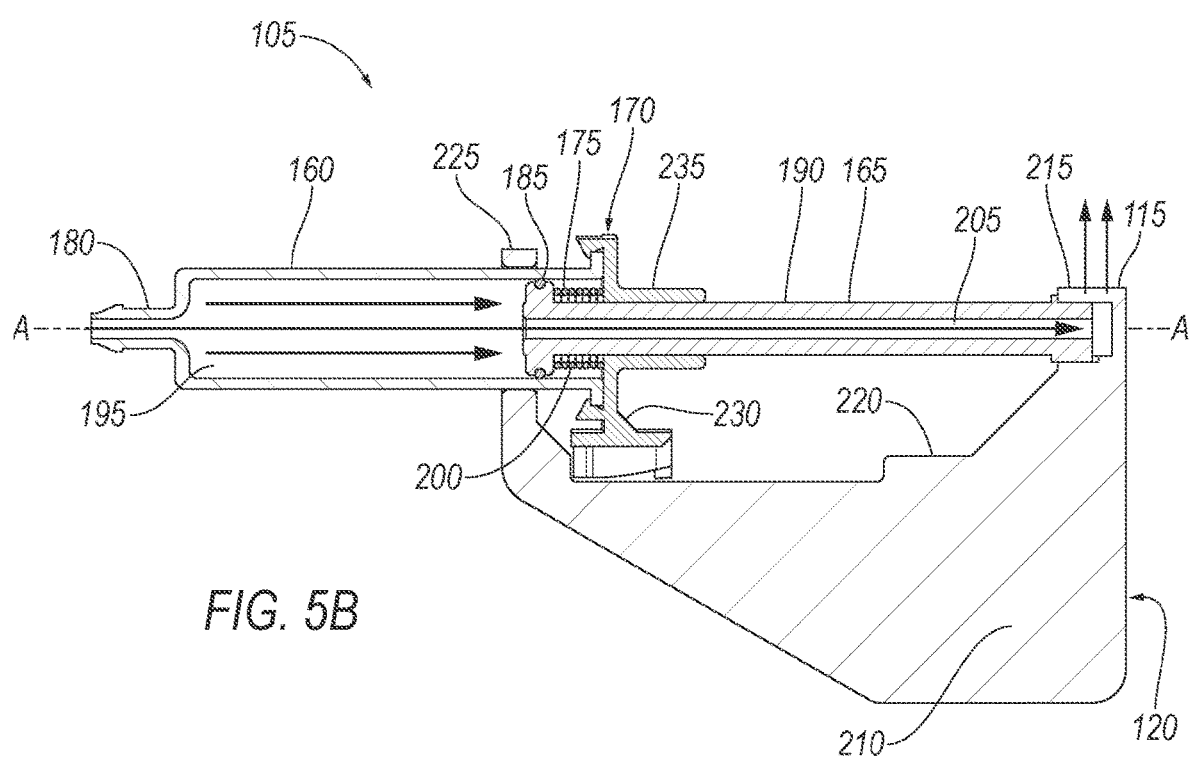
FIG. 5B is a side cross-sectional view of the portion of the first example of the vehicle assembly with the plunger in an extended axial position.

With reference to FIGS. 5A-B, the plunger 165 includes a seal 185 and a tube portion 190. The seal 185 has a circular shape matching an internal diameter of the cylindrical chamber 160. The seal 185 divides the interior of the cylindrical chamber 160 into a first region 195 and a second region 200 and fluidly isolates the first region 195 and the second region 200 from each other. The first region 195 of the cylindrical chamber 160 is supplied by the inlet 180. Activation of the pump 150 pushes fluid into the first region 195 via the inlet 180 and thereby pressurizes the first region 195. The seal 185 blocks fluid from flowing between the first region 195 and the second region 200.

The tube portion 190 is elongated from the seal 185 to the nozzle 115. The tube portion 190 may be sufficiently long that the nozzle 115 is outside the cylindrical chamber 160 when the plunger 165 is in the retracted axial position. The plunger 165 includes a passage 205 fluidly connecting the first region 195 and the nozzle 115. The passage 205 extends from an opening in the seal 185 that is open to the first region 195 through the tube portion 190 to the nozzle 115 located at an outboard end of the plunger 165.

The plunger 165 is slidable within the cylindrical chamber 160 along the axis A between the retracted axial position (as shown in FIG. 5A) and the extended axial position (as shown in FIG. 5B). Axial movement of the plunger 165 changes the volumes of the first region 195 and the second region 200, with the first region 195 smaller when the plunger 165 is in the retracted axial position and larger when the plunger 165 is in the extended axial position. Pressurization of the first region 195 tends to push the plunger 165 to move (along with the nozzle 115 and the wind panel 120) to the extended axial position.

The spring 175 is attached to the cylindrical chamber 160 and to the plunger 165. The spring 175 is arranged to bias the plunger 165 to move (along with the nozzle 115 and the wind panel 120) to the retracted axial position when the plunger 165 is in the extended axial position. For example, the spring 175 may extend from the outboard end of the cylindrical chamber 160 through the second region 200 to the seal 185, and the spring 175 may be loaded in compression such that the spring 175 is compressed when the plunger 165 is in the extended axial position and the spring 175 is less compressed or uncompressed when the plunger 165 is in the retracted axial position. The spring 175 may be any suitable type, e.g., a coil spring.

The axial position of the plunger 165 may be controlled by the level of pressurization of the first region 195, e.g., by activation of the pump 150. When the force exerted by the pressurization of the first region 195 on the seal 185 is greater than the force exerted by the spring 175, the plunger 165 moves from the retracted axial position to the extended axial position. When the force exerted by the pressurization of the first region 195 on the seal 185 is less than the force exerted by the spring 175, the plunger 165 moves from the extended axial position to the retracted axial position.

Figure 6A:
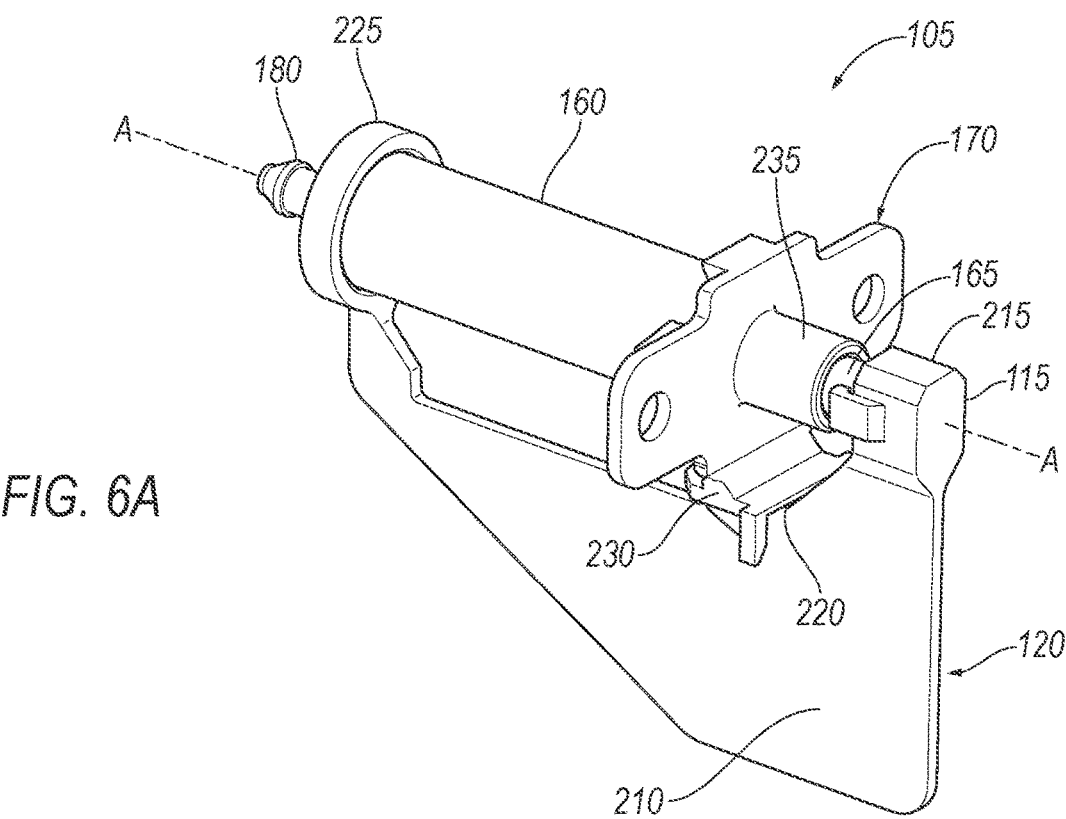
FIG. 6A is a perspective view of the portion of the first example of the vehicle assembly with the plunger in the retracted axial position.
Figure 6B:
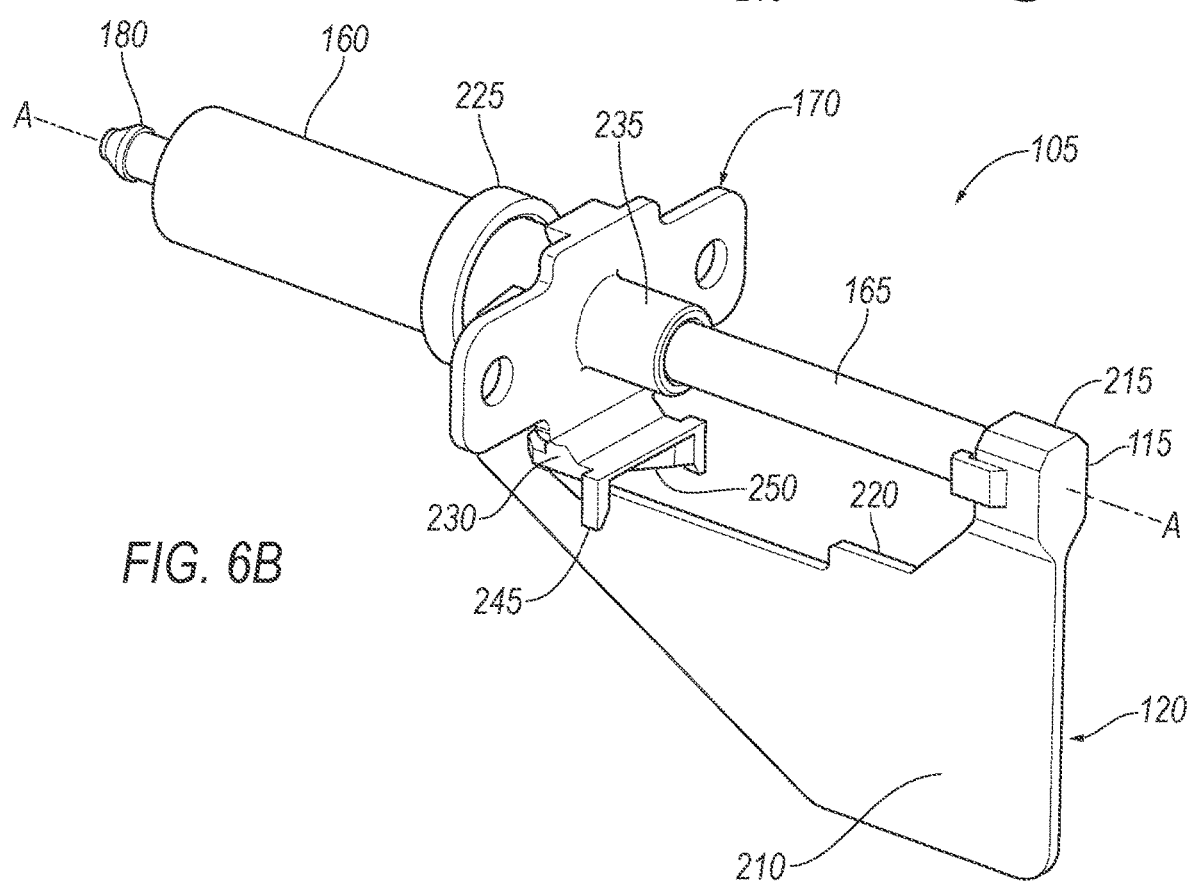
FIG. 6B is a perspective view of the portion of the first example of the vehicle assembly with the plunger in the extended axial position.

With reference to FIGS. 6A-B, the wind panel 120 may include a panel portion 210, a nozzle portion 215, a tab 220, and a ring 225. The nozzle 115 is fixed to the wind panel 120. For example, the nozzle 115 may be integral with the wind panel 120, i.e., the nozzle 115 and the wind panel 120 may be a single piece. The nozzle portion 215 of the wind panel 120 may include the nozzle 115.

The wind panel 120 may be attached to the plunger 165, e.g., via the nozzle portion 215. The wind panel 120 may be axially fixed relative to the plunger 165 by the nozzle portion 215. The nozzle portion 215 may permit rotation of the wind panel 120 about the axis A relative to the plunger 165. The nozzle portion 215 may be located outside the cylindrical chamber 160 regardless of whether the plunger 165 is in the extended or retracted axial position.

The ring 225 is fixed to the wind panel 120, e.g., integral with the wind panel 120. The ring 225 extends around an exterior surface of the cylindrical chamber 160 and is centered on the axis A. The ring 225 may have an internal diameter matching an external diameter of the cylindrical chamber 160. The ring 225 is slidable along the exterior surface of the cylindrical chamber 160 and rotatable with the wind panel 120 about the axis A. The ring 225 fixes the wind panel 120 to the cylindrical chamber 160 other than translational motion along the axis A and rotational motion about the axis A. The ring 225 may be closer to the inboard end of the cylindrical chamber 160 when the plunger 165 is in the retracted axial position and closer to the outboard end of the cylindrical chamber 160 when the plunger 165 is in the extended axial position.

The wind panel 120, e.g., the panel portion 210, extends coplanar with the axis A. The panel portion 210 is elongated in two spatial dimensions, i.e., elongated radially and axially relative to the axis A. The panel portion 210 may have a generally constant thickness and may be generally flat. The wind panel 120 extends generally vertically, permitting the panel portion 210 to face in the direction of forward travel of the vehicle 100 such that airflow from the forward travel of the vehicle 100 presses against the flat surface of the panel portion 210 of the wind panel 120.

The nozzle 115 and the wind panel 120 are movable together along the axis A between the retracted axial position concealed behind the vehicle exterior panel 110 (as shown in FIG. 6A) and the extended axial position extending outward from the vehicle exterior panel 110 (as shown in FIG. 6B). The nozzle 115 and the wind panel 120 are movable along the axis A between the retracted axial position and the extended axial position together with the plunger 165 sliding within the cylindrical chamber 160.

Figure 7B:
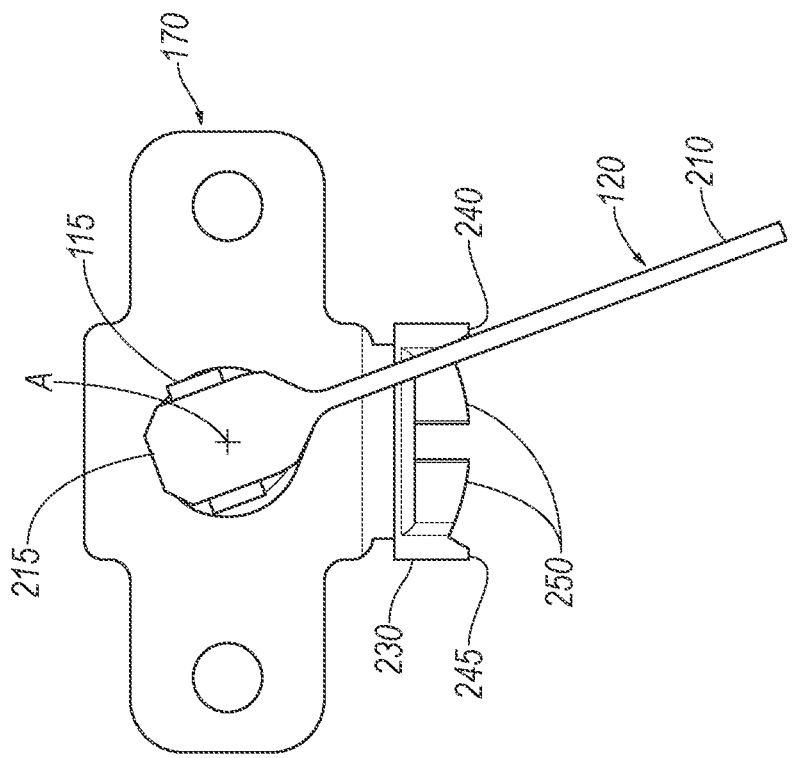
FIG. 7B is a plan view of the bracket and the wind panel of the first example of the vehicle assembly with the wind panel in an off-center rotational position.
Figure 7A:
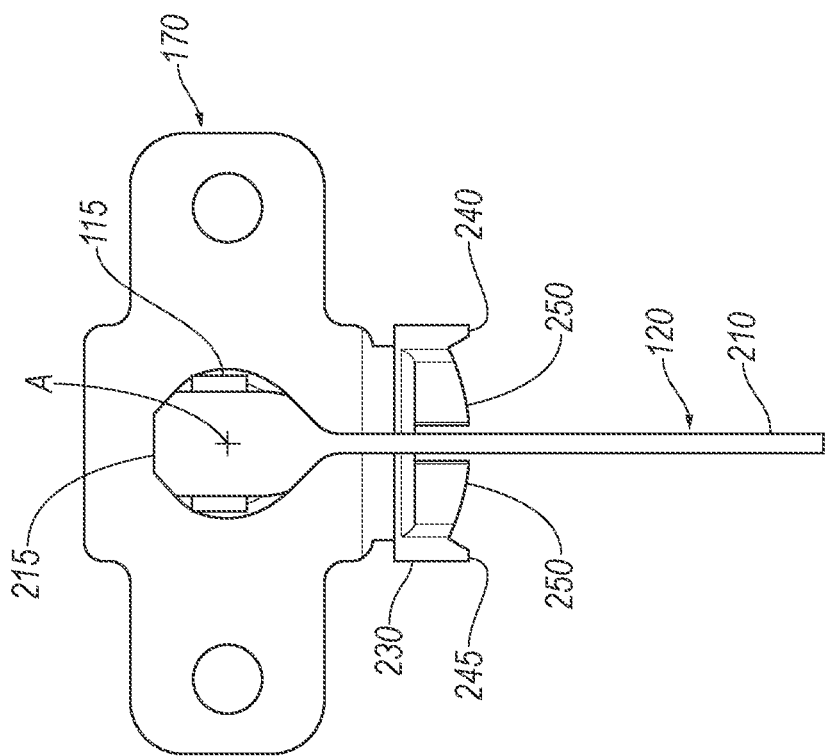
FIG. 7A is a plan view of a bracket and wind panel of the first example of the vehicle assembly with the wind panel in a centered rotational position.

With reference to FIGS. 7A-B, the nozzle 115 and the wind panel 120 are rotatable together about the axis A when in the extended axial position. The nozzle 115 and the wind panel 120 may be rotatable between a centered rotational position (as shown in FIG. 7A) and a fully rotated position (as shown in FIG. 7B). The wind panel 120 in the extended axial position is exposed outside the vehicle exterior panel 110. The wind panel 120 is arranged to rotate the nozzle 115 about the axis A responsive to airflow directed at that wind panel 120, e.g., at the panel portion 210. For example, forward travel by the vehicle 100 generates airflow relative to the vehicle exterior panel 110 in a vehicle-rearward direction. That airflow presses against surface of the panel portion 210, generating a moment (i.e., a torque) about the axis A that rotates the wind panel 120 and the nozzle 115 together.

The nozzle 115 in the extended axial position is rotatable about the axis A between the centered rotational position and the fully rotated position. The nozzle 115 may occupy any rotational position between the centered rotational position and the fully rotated position. The nozzle 115 in at least one rotational position, e.g., the centered position, may be aimed at the sensor 125, i.e., a center of a spray pattern from the nozzle 115 may intersect the sensor 125. The nozzle 115 in at least one rotational position may be aimed in a direction for which the sensor 125 is in a path of liquid ejected by the nozzle 115 and redirected by airflow across the vehicle exterior panel 110. For example, the sensor 125 may be positioned above the nozzle 115, and the nozzle 115 may be aimed upward above the sensor 125 such that the airflow from the vehicle 100 traveling forward curves the fluid ejected from the nozzle 115 to strike the sensor 125. The wind panel 120 thus serves to aim the nozzle 115 to clean the sensor 125 both when the airflow is present and absent, e.g., when the vehicle 100 is traveling forward and stationary.

With reference to FIGS. 8A-C, the vehicle assembly 105 includes a guide member 230 fixed relative to the vehicle exterior panel 110. The bracket 170 may include the guide member 230, e.g., the guide member 230 may be an integral portion of the bracket 170. The bracket 170 may further include a plunger guide 235, a first stop 240, and a second stop 245. The bracket 170 may be integral, i.e., a single piece.

The plunger guide 235 may be a circular port centered on the axis A. The plunger guide 235 may have an internal diameter matching an external diameter of the tube portion 190 of the plunger 165. The plunger guide 235 holding the tube portion 190 combined with the cylindrical chamber 160 holding the seal 185 may keep the plunger 165 aligned on the axis A as the plunger 165 moves between the retracted and extended axial positions.

The guide member 230 is arranged to force the wind panel 120 to rotate to a center rotational position as the wind panel 120 moves from the extended axial position to the retracted axial position. The guide member 230 extends from a first end closer to the vehicle exterior panel 110 (i.e., an outboard end) to a second end farther from the vehicle exterior panel 110 (i.e., an inboard end). The guide member 230 includes two guide surfaces 250 that taper toward each other from the first end to the second end. The guide surfaces 250 may follow continuous paths from the first end to the second end, e.g., linear paths.

The wind panel 120 includes the tab 220. The tab 220 is positioned to engage with the guide surfaces 250 as the wind panel 120 moves from the extended axial position to the retracted axial position. The tab 220 may be spaced from the guide member 230 along the axis A when the wind panel 120 is in the extended axial position. The tab 220 is positioned at a radial distance from the axis A that overlaps the radial extent of the guide surfaces 250 from the axis A. The portion of the wind panel 120 that is inboard from the tab 220 (e.g., the panel portion 210) may be positioned at a greater radial distance from the axis A than the radial extent of the guide surfaces 250 from the axis A. Thus, when the wind panel 120 is in the extended axial position, the guide surfaces 250 do not constrain the rotational position of the wind panel 120. When the wind panel 120 moves from the extended axial position to the retracted axial position, if the tab 220 is rotationally off-center, the tab 220 contacts one of the guide surfaces 250. The tab 220 follows the guide surface to the second end of the guide member 230. The tab 220 may be positioned at the second end of the guide member 230 when the wind panel 120 is in the retracted axial position. The guide surfaces 250 may be spaced apart by substantially the thickness of the tab 220 at the second end of the guide member 230, thereby centering the tab 220 and the rest of the wind panel 120 when the wind panel 120 is at the retracted axial position.

With reference to FIG. 9, the first stop 240 and the second stop 245 are fixed relative to the vehicle exterior panel 110. The stops 240, 245 are positioned to block the wind panel 120 from rotating beyond respective first and second rotational positions. The stops 240, 245 are positioned radially farther from the axis A than the guide surfaces 250 are. The stops 240, 245 are positioned radially to intersect the portion of the wind panel 120 that is inboard from the tab 220, e.g., to intersect the panel portion 210. The wind panel 120 is thus able to rotate between the panel portion 210 contacting the first stop 240 (i.e., the first rotational position) and the panel portion 210 contacting the second stop 245 (i.e., the second rotational position), and the wind panel 120 is blocked by the stops 240, 245 from rotating outside that angular range.

When the wind panel 120 is in any rotational position from the first rotational position to the second rotational position, the tab 220 is positioned circumferentially between the guide surfaces 250 at the first end of the guide member 230. For example, the stops 240, 245 may be circumferentially positioned approximately at the respective guide surfaces 250 at the first end of the guide member 230. Thus, for any rotational position to which the wind panel 120 is able to rotate, the tab 220 will engage the guide surfaces 250 when the wind panel 120 moves from the extended axial position to the retracted axial position.

In operation, the vehicle assembly 105 by default begins with the wind panel 120 and the nozzle 115 in the centered rotational position and the plunger 165, the wind panel 120, and the nozzle 115 in the retracted axial position. When the pump 150 is activated, the fluid flows to the inlet 180 of the cylindrical chamber 160 and pressurizes the first region 195 of the interior of the cylindrical chamber 160. The pressurization pushes the plunger 165 with sufficient force to overcome the force of the spring 175, moving the plunger 165, the wind panel 120, and the nozzle 115 to the extended axial position. The pressurization also pushes fluid through the passage 205 of the plunger 165 to the nozzle 115, and the fluid sprays from the nozzle 115. If no airflow is moving across the vehicle exterior panel 110, the wind panel 120 and the nozzle 115 stay in the centered rotational position, and the fluid from the nozzle 115 travels to the sensor 125. If airflow is moving across the vehicle exterior panel 110, the airflow pushes against the panel portion 210 of the wind panel 120, rotating the wind panel 120 and the nozzle 115. The rotational motion of the nozzle 115 can help ensure that the fluid still travels from the nozzle 115 to the sensor 125 despite the effect of the airflow. The tab 220 may engage the stop, thereby preventing the wind panel 120 and the nozzle 115 from over-rotating. When the pump 150 is deactivated, the force of the spring 175 overcomes the lowered pressure in the first region 195 of the cylindrical chamber 160, pushing the plunger 165 from the extended axial position to the retracted axial position. As the wind panel 120 moves with the plunger 165 from the extended axial position to the retracted axial position, the tab 220 contacts one of the guide surfaces 250 and follows the guide surface from the first end to the second end of the guide member 230, thereby rotating the wind panel 120 to the centered position.

Figure 10:
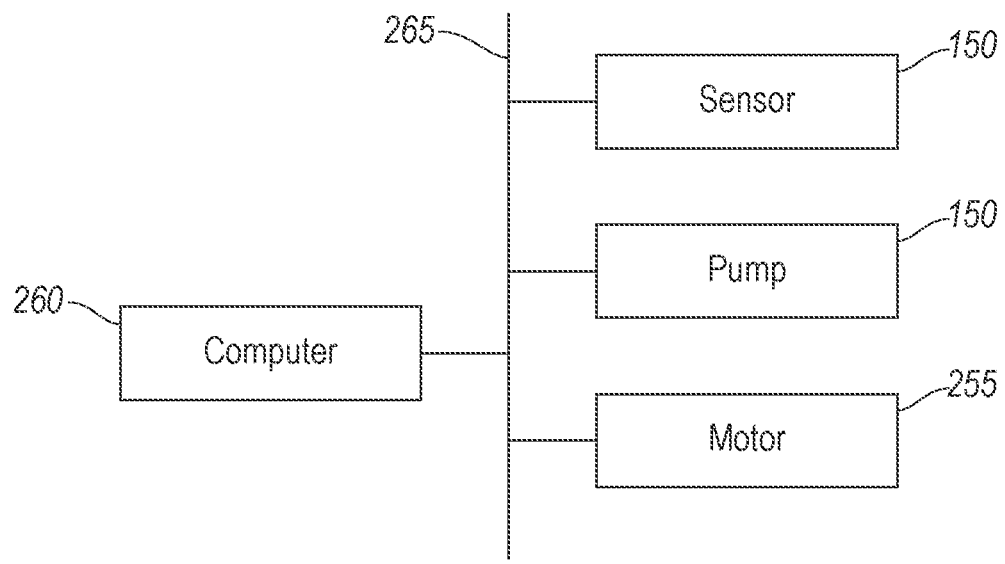
FIG. 10 is a block diagram of a control system for the vehicle assembly.

With reference to FIG. 10, the vehicle assembly 105 may optionally include a motor 255, e.g., a stepper motor. The motor 255 may be positioned to rotate the wind panel 120, e.g., fixed relative to the vehicle exterior panel 110 and operatively coupled to the wind panel 120. The motor 255 may be able to rotate the wind panel 120 and the nozzle 115 to predefined rotational positions. Alternatively, the motor 255 may be absent, and the rotation of the wind panel 120 may be dictated solely by airflow over the wind panel 120.

The vehicle assembly 105 may include a computer 260. The computer 260 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 260 can thus include a processor, a memory, etc. The memory of the computer 260 can include media for storing instructions executable by the processor as well as for electronically storing data and/or databases, and/or the computer 260 can include structures such as the foregoing by which programming is provided. The computer 260 can be multiple computers coupled together.

The computer 260 may transmit and receive data through a communications network 265. The communications network 265 may be, e.g., a controller area network (CAN) bus, Ethernet, WiFi, Local Interconnect Network (LIN), onboard diagnostics connector (OBD-II), and/or any other wired or wireless communications network. The computer 260 may be communicatively coupled to the sensor 125, the pump 150, the motor 255 if present, and other components via the communications network 265.

The computer 260 may be programmed to activate the pump 150 in response to data indicating an obstruction of the sensor 125. The computer 260 may be programmed to determine that the sensor 125 has an obstruction based on data from the sensor 125, e.g., data indicating that a region of an image frame returned by the sensor 125 is unchanging over a period of time as the vehicle 100 moves.

The computer 260 may be programmed to activate the motor 255 to rotate the wind panel 120 and the nozzle 115 to a rotational position based on a speed of the vehicle 100. The speed is a longitudinal speed, i.e., a speed in a forward direction of travel. The computer 260 may receive the speed from a speed sensor such as a speedometer, a wheel speed sensor, etc. The computer 260 may activate the motor 255 to move the wind panel 120 and the nozzle 115 to a higher angular position for a higher speed of the vehicle 100.

Figure 11:
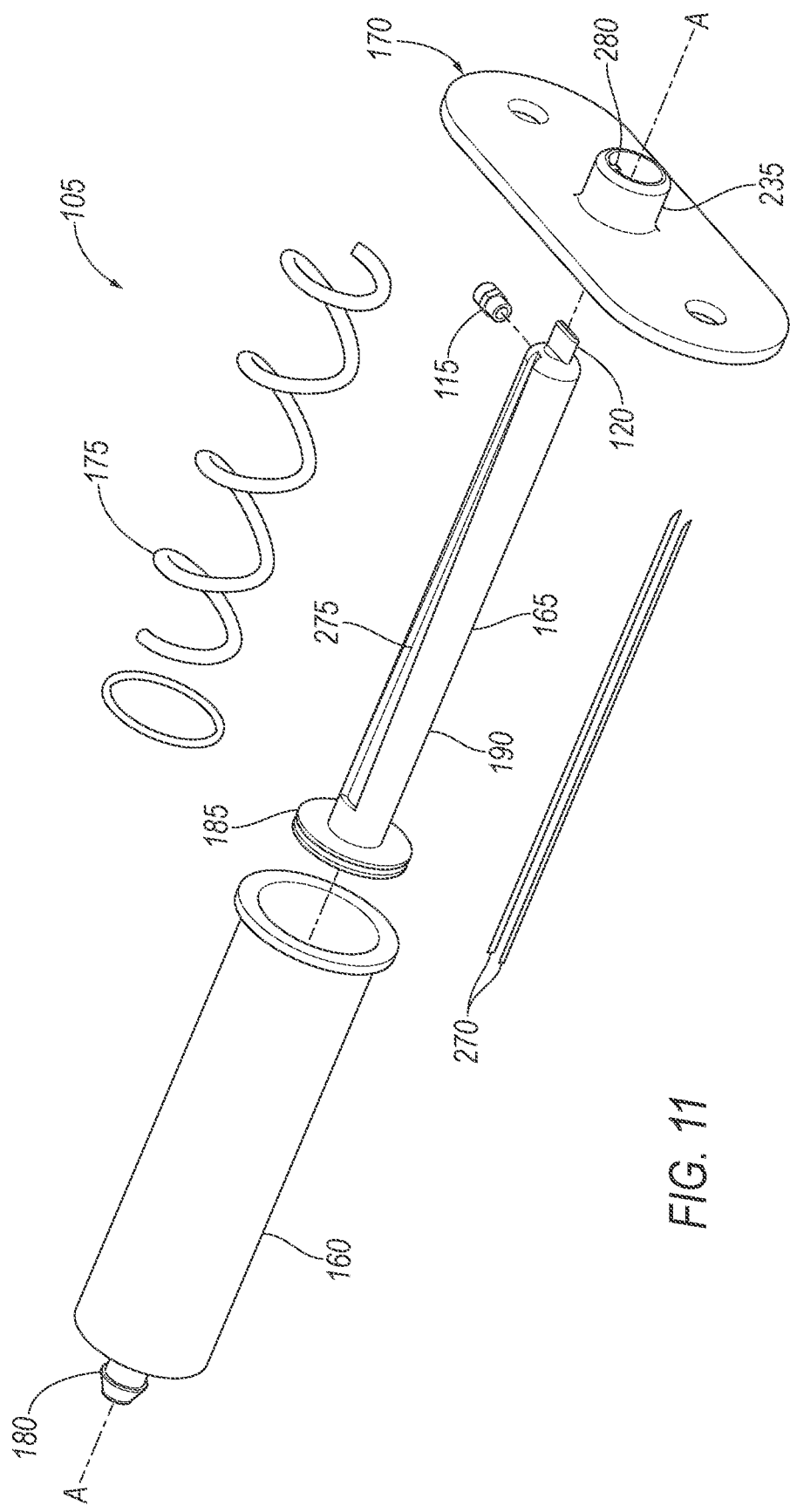
FIG. 11 is an exploded perspective view of a second example of the vehicle assembly.
Figure 12A:
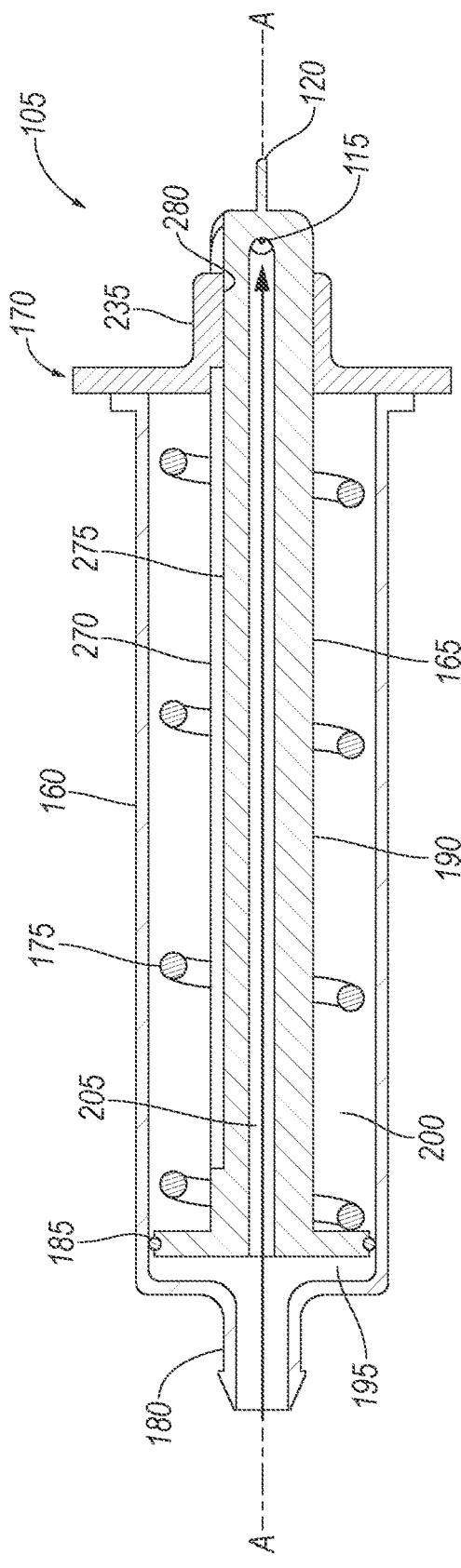
FIG. 12A is a side cross-sectional view of a portion of the second example of the vehicle assembly with the plunger in the retracted axial position.
Figure 12B:
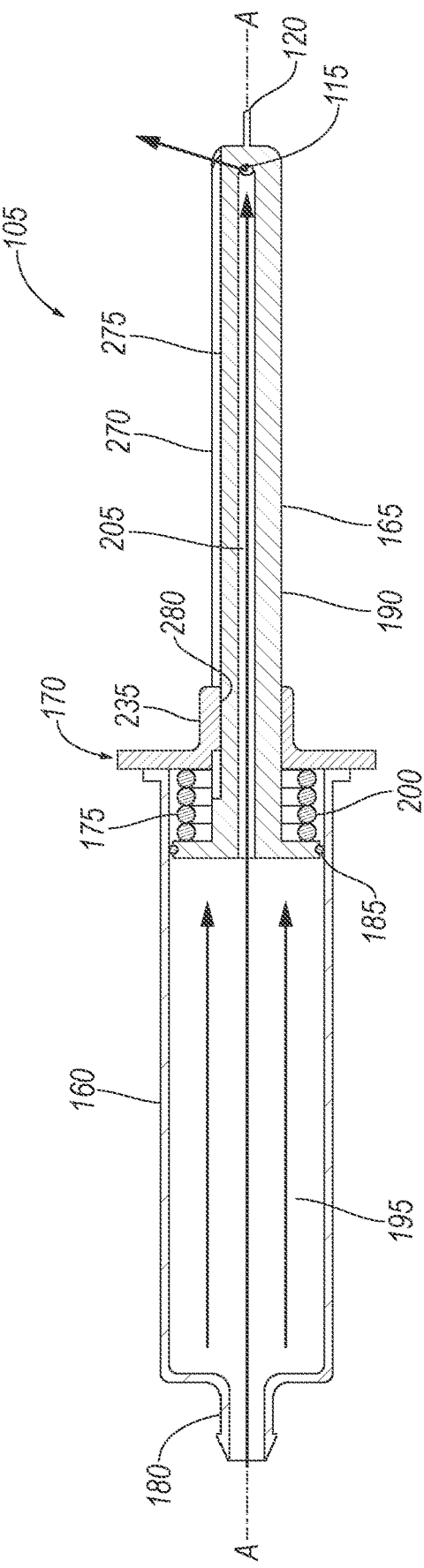
FIG. 12B is a side cross-sectional view of the portion of the second example of the vehicle assembly with the plunger in the extended axial position.
Figure 13A:
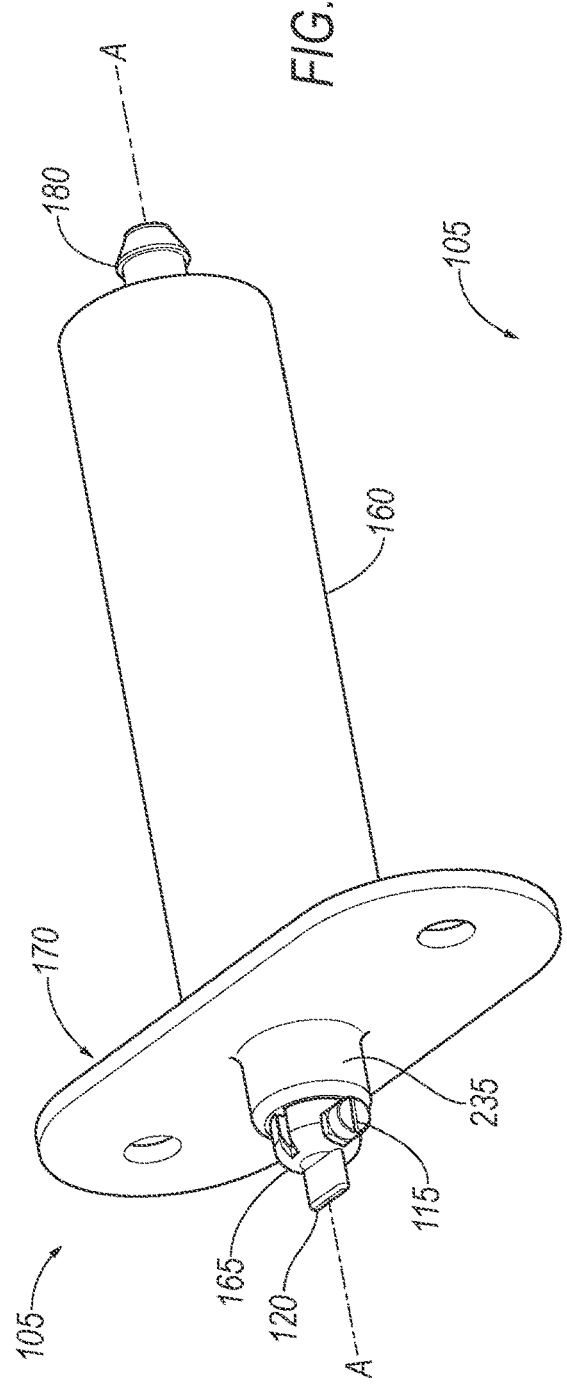
FIG. 13A is a perspective view of the portion of the second example of the vehicle assembly with the plunger in the retracted axial position.
Figure 13B:
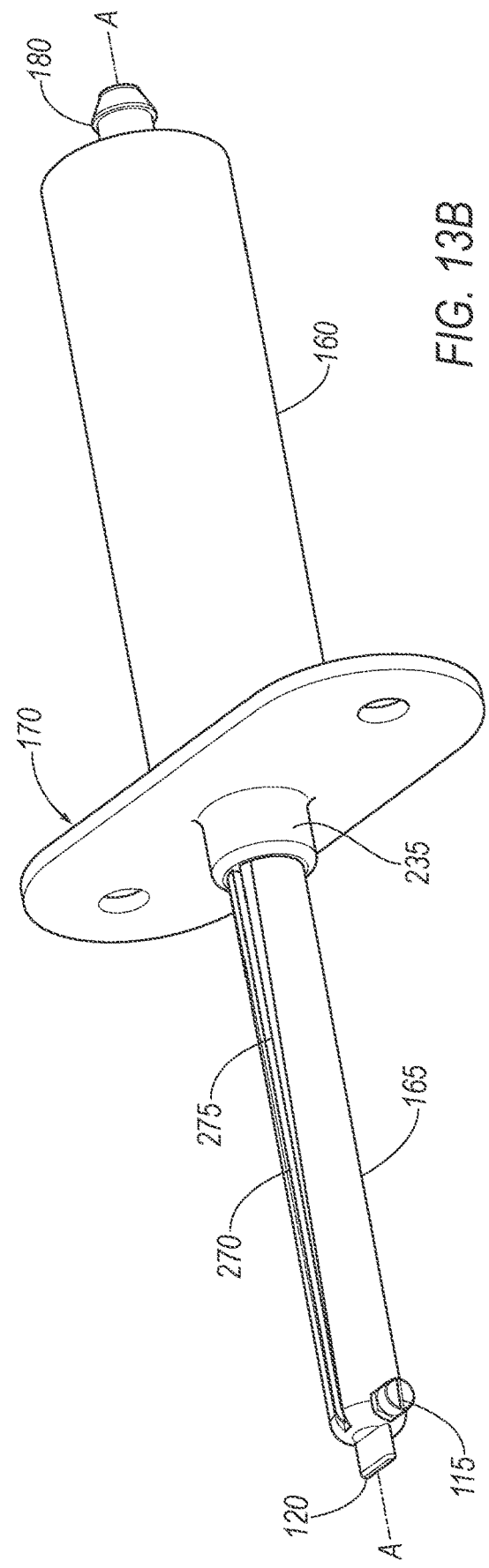
FIG. 13B is a perspective view of the portion of the second example of the vehicle assembly with the plunger in the extended axial position.

With reference to FIG. 11, as an overview of a second example, the vehicle assembly 105 may include the vehicle exterior panel 110 (shown in FIG. 1), the bracket 170, the cylindrical chamber 160, the plunger 165, the spring 175, leaf springs 270, the nozzle 115, and the wind panel 120. The bracket 170 and the cylindrical chamber 160 may be fixed relative to the vehicle exterior panel 110. The spring 175 may extend from the cylindrical chamber 160 to the plunger 165. The plunger 165, the nozzle 115, and the wind panel 120 may be movable together along an axis A defined by the cylindrical chamber 160 relative to the vehicle exterior panel 110, the cylindrical chamber 160, and the bracket 170. The plunger 165, the nozzle 115, and the wind panel 120 may be rotatable together about the axis A relative to the cylindrical chamber 160.

With reference to FIGS. 12A-13B, some of the description above for the first example is applicable as well to the second example, e.g., the description with respect to FIGS. 3-4 of the bracket 170 and the cylindrical chamber 160, and the description with respect to FIGS. 5A-B of the plunger 165, the spring 175, and the axial movement of the plunger 165.

Figure 14:
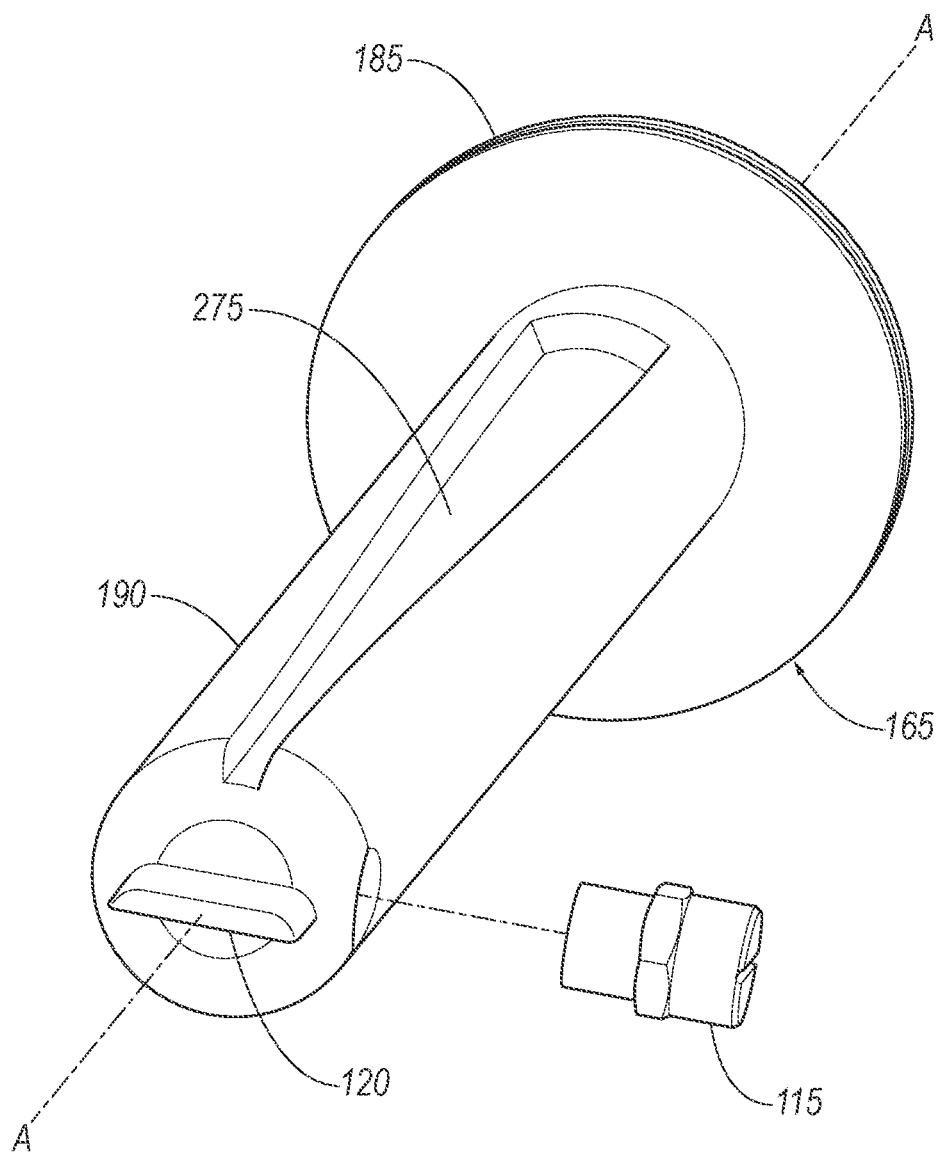
FIG. 14 is a perspective view of the plunger of the second example of the vehicle assembly.

With reference to FIG. 14, the plunger 165 includes a slot 275 elongated parallel to the axis A from a first end closer to the nozzle 115 (i.e., an outboard end) to a second end farther from the nozzle 115 (i.e., an inboard end). The slot 275 tapers, i.e., narrows, from the second end to the first end. Specifically, the surfaces of the slot 275 running axially taper toward each other from the second end to the first end. The surfaces of the slot 275 may follow continuous paths from the first end to the second end, e.g., linear paths.

Figure 8A:
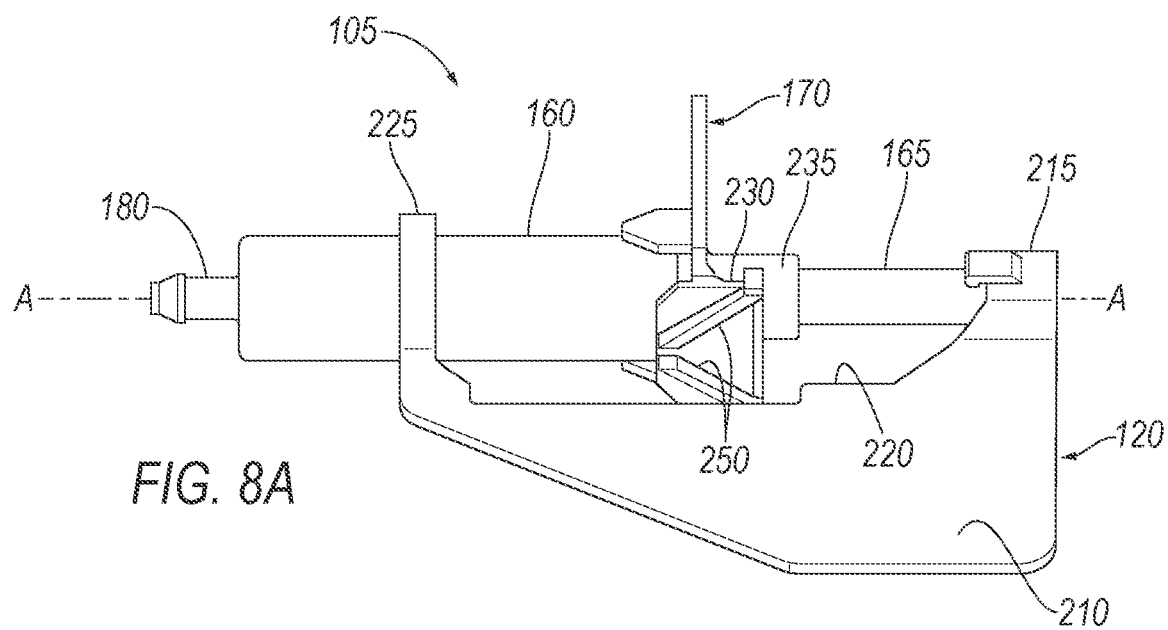
FIG. 8A is a bottom perspective view of the portion of the first example of the vehicle assembly with the plunger and the wind panel in the extended axial position.
Figure 8B:
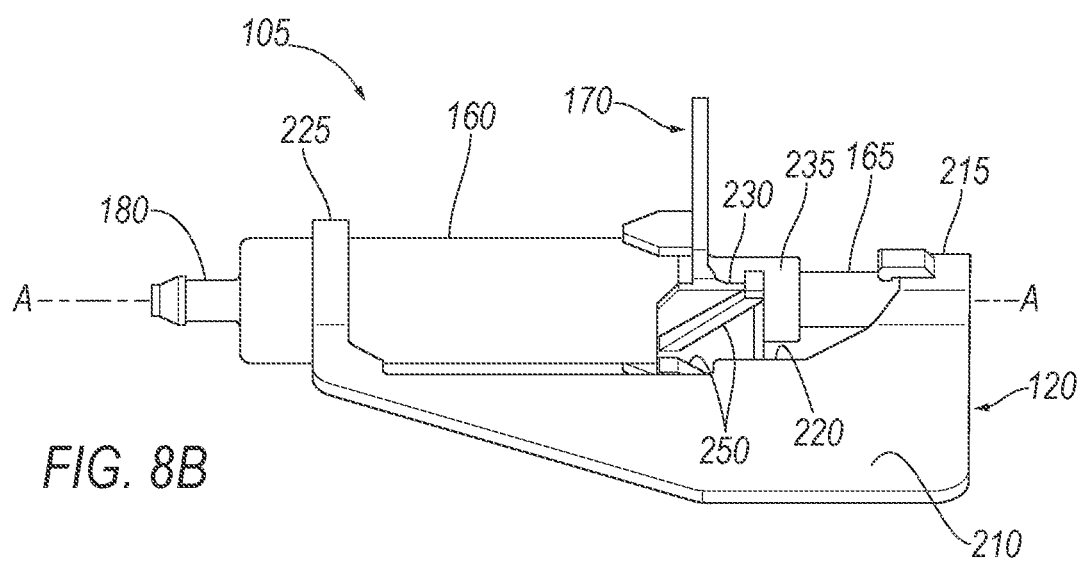
FIG. 8B is a bottom perspective view of the portion of the first example of the vehicle assembly with the plunger and the wind panel in an intermediate axial position.
Figure 8C:
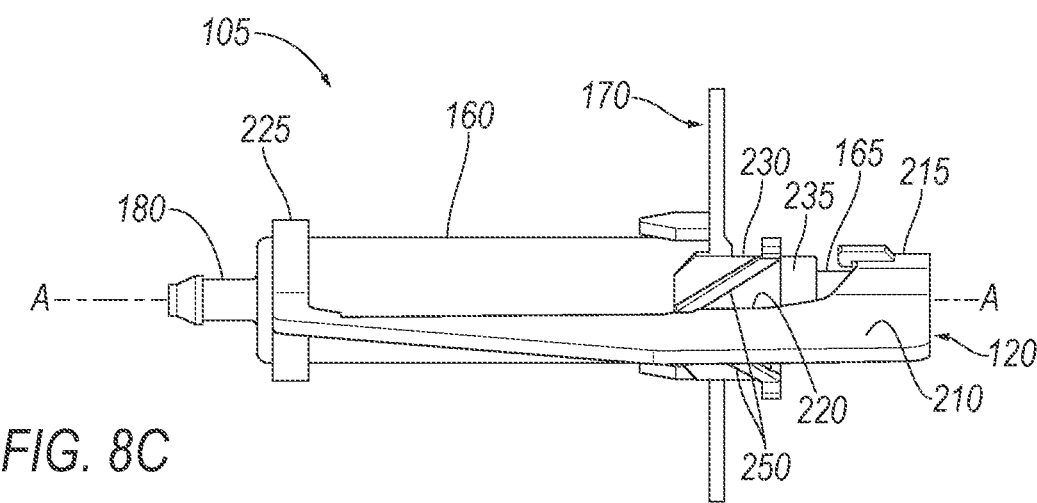
FIG. 8C is a bottom perspective view of the portion of the first example of the vehicle assembly with the plunger and the wind panel in the retracted axial position.
Figure 9:
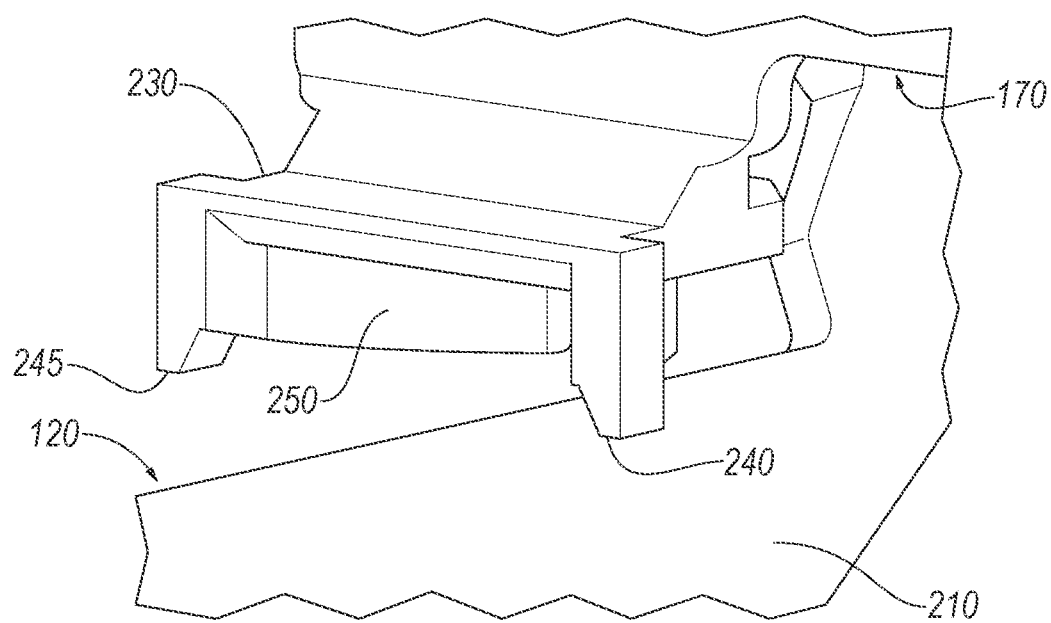
FIG. 9 is a perspective view of a portion of the bracket and the wind panel of the first example of the vehicle assembly.
Figure 15A:
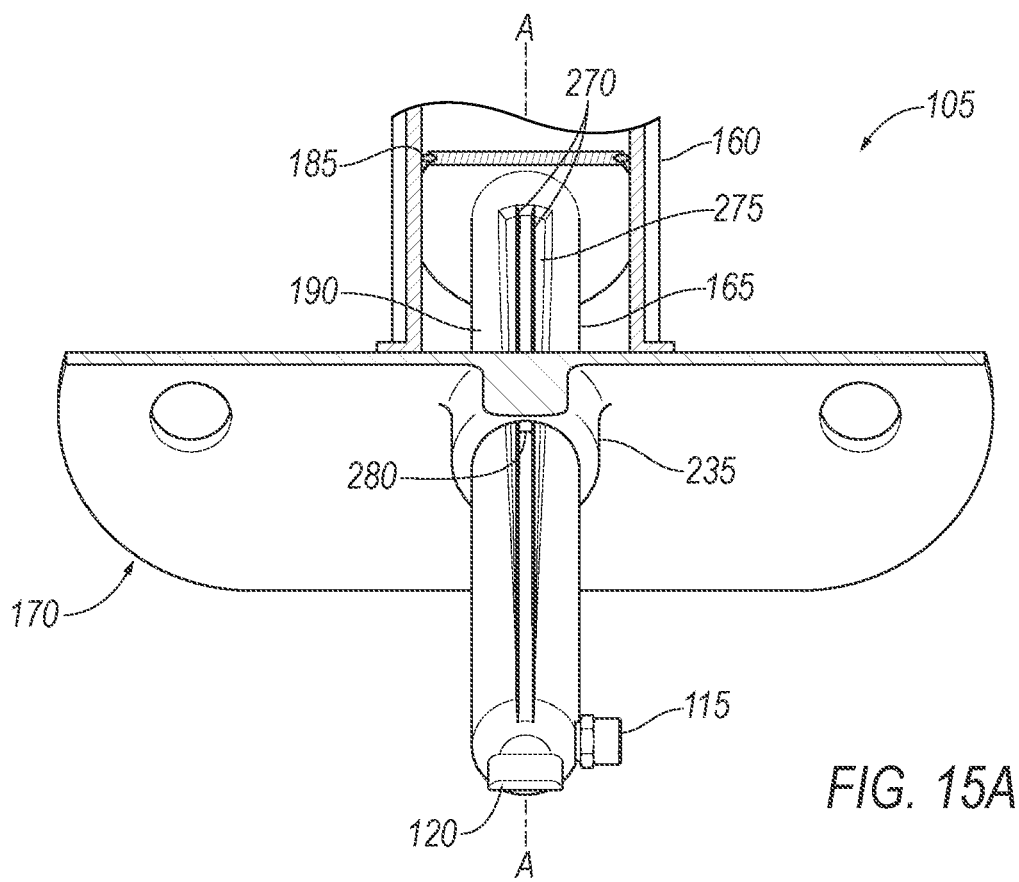
FIG. 15A is a top perspective cross-sectional view of a portion of the second example of the vehicle assembly with the plunger in a centered rotational position.
Figure 15B:
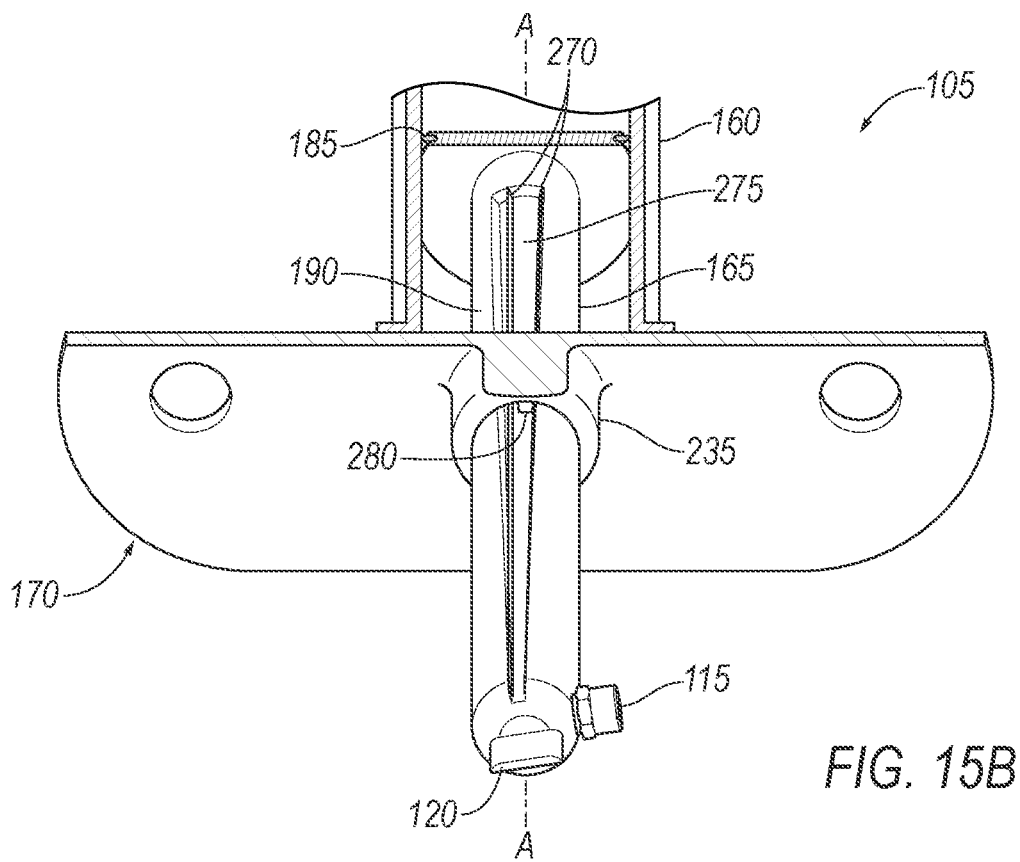
FIG. 15B is a top perspective cross-sectional view of the portion of the second example of the vehicle assembly with the plunger in an off-center rotational position.

With reference to FIGS. 15A-B, the bracket 170 may include a plunger guide 235 as described above with respect to FIGS. 8A-C. Additionally, the bracket 170 may include a peg 280. The peg 280 is fixed relative to the vehicle exterior panel 110, e.g., via the bracket 170 being fixed to the vehicle exterior panel 110. The peg 280 extends radially inward from the inside diameter of the plunger guide 235 relative to the axis A. The peg 280 is positioned in the slot 275. When the plunger 165 moves from the extended axial position to the retracted axial position, if the center of the slot 275 is circumferentially off-center from the peg 280 relative to the axis A, one of the surfaces of the slot 275 contacts the peg 280. The stationary peg 280 pushes against the surface of the slot 275 as the first end of the slot 275 moves toward the peg 280. The width of the peg 280, i.e., the dimension running circumferentially relative to the axis A, is approximately equal to the width of the slot 275 at the first end, i.e., is approximately equal to the narrowest width of the slot 275. Thus, when the first end of the slot 275 reaches the peg 280, the plunger 165 is rotationally centered.

At least one leaf spring 270, e.g., two leaf springs 270, is positioned in the slot 275. The leaf springs 270 may be elongated from the first end of the slot 275 to the second end of the slot 275. The two leaf springs 270 may be parallel to each other. The two leaf springs 270 may be spaced apart at a distance approximately equal to the width of the peg 280, i.e., to the narrowest width of the slot 275. The leaf springs 270 may be engageable by the peg 280. For example, the peg 280 may be positioned between the leaf springs 270 and may flex one of the leaf springs 270 when the plunger 165 rotates away from the centered rotational position. The leaf springs 270 may thus be positioned to bias the plunger 165 to the centered rotational position relative to the peg 280.

The wind panel 120 is fixed relative to the plunger 165. For example, the wind panel 120 and the plunger 165 may be integral, i.e., a single piece. The wind panel 120 may extend in an outboard direction from an outboard end of the plunger 165. The wind panel 120 may extend generally horizontally through the axis A.

The wind panel 120 may be an airfoil. The term "airfoil" is used in its aerospace sense as a streamlined body capable of generating significantly more lift than drag when subject to airflow. The wind panel 120 has an upper surface and a lower surface that meet at a leading edge and a trailing edge. The upper surface and the lower surface have different path lengths from the leading edge to the trailing edge, thereby generating lift. The generated lift causes the wind panel 120 to rotate, and the plunger 165 and the nozzle 115 rotate with the wind panel 120. The rotation may aim the nozzle 115 farther upward, so the nozzle 115 delivers fluid that, when following a path curved rearward by the airflow, still strikes the sensor 125. A lack of airflow results in a lack of generated lift, leaving the wind panel 120 in the centered rotational position.

Features of the first example of the vehicle assembly 105 can be incorporated into the second example and vice versa. For example, the wind panel 120 from the second example can be used in place of the panel portion 210 of the wind panel 120 in the first example, i.e., using the guide member 230 and tab 220 for re-centering the plunger 165 and the wind panel 120 upon retraction. For another example, the wind panel 120 from the first example can be used in place of the wind panel 120 in the second example, i.e., using the slot 275 and peg 280 for re-centering the wind panel 120 upon retraction.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described. Operations, systems, and methods described herein should always be implemented and/or performed in accordance with an applicable owner's/user's manual and/or safety guidelines.

What is claimed is:

1. A vehicle assembly comprising:
a vehicle exterior panel;
a nozzle; and
a wind panel fixed to the nozzle;
the nozzle and the wind panel movable together along an axis between a retracted axial position concealed behind the vehicle exterior panel and an extended axial position extending outward from the vehicle exterior panel;
the nozzle and the wind panel rotatable together about the axis when in the extended axial position; and
the wind panel arranged to rotate the nozzle about the axis responsive to airflow directed at the wind panel.

2. The vehicle assembly of claim 1, further comprising a sensor coupled to the vehicle exterior panel, the nozzle in the extended axial position being rotatable about the axis to a first rotational position at which the nozzle is aimed at the sensor.

3. The vehicle assembly of claim 2, wherein the nozzle in the extended axial position is rotatable about the axis to a second position at which the nozzle is aimed in a direction for which the sensor is in a path of liquid ejected by the nozzle and redirected by airflow across the vehicle exterior panel.

4. The vehicle assembly of claim 1, wherein the wind panel extends coplanar with the axis.

5. The vehicle assembly of claim 1, wherein the wind panel extends generally vertically.

6. The vehicle assembly of claim 1, further comprising a cylindrical chamber fixed relative to the vehicle exterior panel and centered on the axis, and a plunger slidable within the cylindrical chamber along the axis, the nozzle located at an end of the plunger, the nozzle and the wind panel movable along the axis between the retracted axial position and the extended axial position together with the plunger sliding within the cylindrical chamber.

7. The vehicle assembly of claim 6, further comprising a ring fixed to the wind panel, the ring extending around the cylindrical chamber and centered on the axis, the ring slidable along an exterior surface of the cylindrical chamber and rotatable with the wind panel about the axis.

8. The vehicle assembly of claim 6, further comprising a spring attached to the cylindrical chamber and to the plunger, the spring biasing the plunger to move the nozzle and wind panel to the retracted axial position when the nozzle and wind panel are in the extended axial position.

9. The vehicle assembly of claim 6, wherein the plunger includes a seal dividing an interior of the cylindrical chamber into a first region and a second region, the cylindrical chamber includes an inlet leading to the first region, and the plunger includes a passage fluidly connecting the first region and the nozzle.

10. The vehicle assembly of claim 9, wherein pressurization of the first region tends to push the plunger to move the nozzle and wind panel to the extended axial position.

11. The vehicle assembly of claim 6, further comprising a peg fixed relative to the vehicle exterior panel, wherein the plunger includes a slot elongated parallel to the axis from a first end closer to the nozzle to a second end farther from the nozzle, the slot tapers narrower from the second end to the first end, and the peg is positioned in the slot.

12. The vehicle assembly of claim 11, further comprising a leaf spring positioned in the slot and engageable by the peg, the leaf spring being positioned to bias the plunger to a centered rotational position relative to the peg.

13. The vehicle assembly of claim 1, further comprising a guide member fixed relative to the vehicle exterior panel, the guide member arranged to force the wind panel to rotate to a center rotational position as the wind panel moves from the extended axial position to the retracted axial position.

14. The vehicle assembly of claim 13, wherein the guide member extends from a first end closer to the vehicle exterior panel to a second end farther from the vehicle exterior panel, the guide member includes two guide surfaces that taper toward each other from the first end to the second end.

15. The vehicle assembly of claim 14, wherein the wind panel includes a tab positioned to engage with the guide surfaces as the wind panel moves from the extended axial position to the retracted axial position.

16. The vehicle assembly of claim 15, wherein the tab is spaced from the guide member along the axis when the wind panel is in the extended axial position.

17. The vehicle assembly of claim 15, further comprising a stop fixed relative to the vehicle exterior panel, the stop positioned to block the wind panel from rotating beyond a first rotational position, wherein the tab is positioned circumferentially between the guide surfaces at the first end of the guide member when the wind panel is in the first rotational position.

18. The vehicle assembly of claim 17, wherein the stop is a first stop, the vehicle assembly further comprising a second stop, the second stop positioned to block the wind panel from rotating beyond a second rotational position, wherein the tab is positioned circumferentially between the guide surfaces at the first end of the guide member when the wind panel is between the first and second rotational positions.

19. The vehicle assembly of claim 1, wherein the wind panel extends generally horizontally through the axis.

20. The vehicle assembly of claim 19, wherein the wind panel is an airfoil.

* * * * *